United States Patent
Chenillo et al.

(10) Patent No.: US 9,332,160 B1
(45) Date of Patent: May 3, 2016

(54) METHOD OF SYNCHRONIZING AUDIO-VISUAL ASSETS

(71) Applicants: Samuel Chenillo, New York, NY (US); Oren Steinfeld, Kfar Saba (IL)

(72) Inventors: Samuel Chenillo, New York, NY (US); Oren Steinfeld, Kfar Saba (IL)

( * ) Notice: Subject to any disclaimer, the term of this patent is extended or adjusted under 35 U.S.C. 154(b) by 0 days.

(21) Appl. No.: 14/848,343

(22) Filed: Sep. 9, 2015

(51) Int. Cl.
  *G06F 15/16* (2006.01)
  *H04N 5/067* (2006.01)
  *H04N 21/242* (2011.01)
  *H04L 29/06* (2006.01)
  *G06F 12/00* (2006.01)

(52) U.S. Cl.
  CPC .............. *H04N 5/0675* (2013.01); *H04L 29/06* (2013.01); *H04N 21/242* (2013.01)

(58) Field of Classification Search
  USPC .......................... 709/201, 203, 223–229, 250
  See application file for complete search history.

(56) References Cited

U.S. PATENT DOCUMENTS

| | | | |
|---|---|---|---|
| 5,264,933 | A | 11/1993 | Rosser et al. |
| 9,116,220 | B2 | 8/2015 | Liu et al. |
| 2002/0184373 | A1* | 12/2002 | Maes .................. G10L 15/30 709/228 |
| 2006/0041431 | A1* | 2/2006 | Maes .................. G10L 15/30 704/270.1 |
| 2006/0149850 | A1 | 7/2006 | Bowman |
| 2012/0191232 | A1* | 7/2012 | Millington ........... H04J 3/0664 700/94 |
| 2013/0067116 | A1 | 3/2013 | Ostergren |
| 2014/0320585 | A1* | 10/2014 | Igoe ................... H04L 12/2809 348/14.04 |
| 2015/0241079 | A1* | 8/2015 | Matsuoka ........... H04L 12/2825 700/276 |

* cited by examiner

*Primary Examiner* — Zarni Maung
(74) *Attorney, Agent, or Firm* — r.r (princeton); Roy Rosser (57) ABSTRACT

A system and method of synchronizing the processing and distribution of audio-visual assets in a distributed production studio are presented. The method addresses the processing of broadcast television, including match moving computer graphics technology, in such an environment. Audio-visual sources provide the assets while processing nodes interact with them to produce a composite output. Synchronization of the communication between, and the processing by, the sources and nodes is managed by a master controller and delay buffers located on the nodes. Assets are tagged with updatable reference-to-zero values indicative of a current transmission delay between their last source and the controller. These reference-to-zero values are used by processing nodes to determine where in their local buffer to place each asset so they emerge from the buffer to a local digital signal processor in synchronicity and that assets originally produced at a common time are executed locally at a common time.

8 Claims, 7 Drawing Sheets

PRIOR ART

160 LIST

SOURCE 1: ID 161; R2Z 162; AB 163; FS 164; FDR 167; BS 168;
SOURCE 2: ID 161; R2Z 162; AB 163; FS 164; FDR 167; BS 168;
...
NODE 1: ID 161; R2Z 162; AB 163; FS 164; MBD 165; PP 166;
NODE 2: ID 161; R2Z 162; AV 163; FS 164; MBD 165; PP 166;
...

METHOD OF SYNCHRONIZING AUDIO-VISUAL ASSETS

CROSS-REFERENCE TO RELATED APPLICATIONS

This application claims no priority to any previous US patent application.

BACKGROUND OF THE INVENTION (1) Field of the Invention

The present invention is directed to the technical problem of synchronizing the processing and distribution of audio-visual assets in a distributed network of asset providers and processors, and more particularly to the technical problem of the synchronization and processing of live broadcast television, including real-time implementation of match moving computer graphics technology, in a distributed, or cloud based, production environment.

(2) Description of Related Art

Television production is the technical art of transforming an event into video images, preferably with an audio accompaniment, for display to an end viewer. Inherent in this technical art is the problem of time synchronization of audio-visual assets originating from different sources.

A traditional solution to this problem is to "genlock" all the television production devices, i.e., arrange for all the equipment being used for the production to function off, or be locked to, a single signal generator. This master signal generator then acts as a common clock so that all the signals originating from the genlocked devices have a common start time and the same phase and may, therefore, be easily combined together.

This solution, however, has its limitations. In particular, it may become cumbersome and inefficient when the production is not performed in a single studio, but, as is increasingly common, is undertaken using a distributed, or cloud based, environment in which the video of the event and the graphics being incorporated into them may be provided from remotely located sources and nodes. A reliable, broadcast quality output may be difficult to achieve because of, for instance, unpredictable variations in transmission times between the various nodes and sources in the system.

In the field of live sports broadcasting it has become common practice to use match moving technology to superimpose graphics on live events so that they look as they are a part of the original scene being broadcast. Using this technology exacerbates the problem of synchronization, especially when efficiencies could be obtained by splitting up the match moving tasks and assigning each of them to a different one of the distributed nodes. The additional problems introduced by this approach include variations in processing times as well as the variations in node to node transmission.

The system and method of the present invention provide a robust, workable solution to such problems as is described in detail below.

The relevant prior art addressing the technical problem articulated above includes:

U.S. Pat. No. 9,116,220 issued to Liu et al. on Aug. 25, 2015 entitled "Time synchronizing sensor continuous and state data signals between nodes across a network" that describes techniques for synchronization of sensor signals between devices. One or more of the devices may collect sensor data. The device may create a sensor signal from the sensor data, which it may make available to other devices upon a publisher/subscriber model. The other devices may subscribe to sensor signals they choose. A device could be a provider or a consumer of the sensor signals. A device may have a layer of code between an operating system and software applications that processes the data for the applications. The processing may include such actions as synchronizing the data in a sensor signal to a local time clock, predicting future values for data in a sensor signal, and providing data samples for a sensor signal at a frequency that an application requests, among other actions.

US Patent Application no. 20130067116 published by Brian H. Ostergren on Mar. 14, 2013 entitled "Synchronizing Streaming Video between Viewers over a Network" that describes a technology by which machines such as gaming (including media) systems are configured to synchronize streaming video between peers over a network, including participants communicating via voice or video chat. The video synchronization may include "full" synchronization that operates to synchronize streaming video that is currently unsynchronized video, by causing participants to stop and buffer, and resume playing from a specified position in the stream. Video synchronization also may include "fast" synchronization that operates to re-synchronize video that has begun to drift out of synchronization, such as by briefly pausing any stream that has gotten ahead of others. Also described is replicating the activation of a video transport control (e.g., pause, fast forward, rewind, skip, and the like) that occurs on one machine to other machines, such that video players behave as if there is a common remote control among the peer systems.

US Patent Application no. 20060149850 published by Timothy D. Bowman on Jul. 6, 2006 entitled "Method and apparatus for synchronizing playback of streaming media in multiple output devices" that describes a method and apparatus for synchronizing streaming media with multiple output devices. One or more media servers serve media streams to one or more output devices (i.e., players). For playback synchronization, one output device is the "master", whereas the remaining output devices are "slaves". More data is requested from the media server by the "master" device to maintain a nominal buffer fill level over time. The "slave" devices receive streamed data from the media server at the rate determined by the master device's data requests, and the average rate of data flow over the streaming network is thus controlled by the frequency of the single "master" device's crystal. "Slave" devices make playback rate corrections to maintain respective buffer fill levels within upper and lower threshold levels. For slow networks, each media data packet timestamp is calculated from the time the master's buffer reaches nominal level.

U.S. Pat. No. 5,264,933 issued to Rosser et al. on Nov. 23, 1993 entitled "Television displays having selected inserted indicia". The patent description includes basic concepts of match move video insertion technology and is hereby incorporated by reference in its entirety.

The application describes an apparatus and method of altering video images to enable the addition of images, message, slogans or indicia in such a manner that they appear to be part of the original image as displayed. The application of the apparatus and method is particularly adapted to be used as advertising during sporting events or other events whereby an operator selects a portion of the video image display such as a portion of a tennis court, recognizes the selected portion and inserts a logo or advertising message into that selected portion. The message is inserted into the selected portion of the court independent of how the scene is being panned or viewed by the television camera. The apparatus employs a pattern recognition algorithm such as the Burt Pyramid Algorithm to recognize the specific selected image portion and by means of the image processor substitute the logo into the first image to provide a display which appears as if the inserted image was actually painted on or otherwise permanently positioned on the court. Thus the inserted images are seamlessly and realistically incorporated into the original even as the original scene is moved, panned, magnified, zoomed or otherwise altered in size or perspective. The resulting composite image appears to the television viewer to be absolutely real and present at the scene.

Various other implementations are known in the art, but, as far as can be reasonably ascertained from currently and readily available documentation, fail to adequately address all of the problems solved by the invention described herein.

BRIEF SUMMARY OF THE INVENTION

An inventive system and method of synchronizing audio-visual assets is disclosed.

The system may, for instance, include one or more audio-visual sources and one or more processing nodes, all of which may be remote from each other and only interconnected via a common digital communications network thereby forming part or all of a distributed, or cloud, based production studio.

In a preferred embodiment, the sources may, for instance, include one or more broadcast quality television cameras that may produce audio-visual assets representative of a live event, while the nodes may include digital signal processors and delay buffers. These nodes and sources may be used cooperatively to produce a composite output that may be all or part of a television broadcast program such as, but not limited to, a broadcast of a live sporting event that may include match moving based special effects.

The synchronization of the communication between, and the processing by, the sources and nodes may be managed by a combination of a master controller having a master clock, a reference-to-zero value associated with audio-visual assets and delay buffers located on the nodes. The reference-to-zero value of a source of node may be indicative of a transmission delay that would be incurred in sending an audio-visual asset from that source or node to the master controller.

In a preferred embodiment, the system may transmit, receive and processing audio-visual assets according to an operator determined chain of processing. In the course of executing that chain of processing, a processing node may, for instance, receive multiple audio-visual assets that may each have been transmitted from a different source or node via the communications network and may therefore have experienced different transmission times in order to reach the processing node. In order to process all the received assets in synchrony, the receiving node may initially place the contents of each asset in a location within its delay buffer determined by the asset's reference-to-zero value. In this manner, when the assets are buffered-out, they are delivered to the nodes digital signal processor aligned in accordance with their time of origin. All the asset data packets reaching a node in the network are, therefore, processed synchronously with respect to each other by that node. Furthermore, when transmitted on to a destination node in accordance with a currently setup chain of processing, at that next node, the resultant data packet will be processed synchronously with data packets originating from other nodes or sources within the network.

The master controller may also be located remotely from the nodes and sources and may only be functionally connected to them via a digital communications network. In order to manage and synchronize the sources, nodes and the audio-visual assets produced by them, the master controller may include a master clock that may be used to compile, and continuously update, a master list of the relevant attributes of all the nodes and sources that may be actively involved in the current chain of processing.

This master list may, for instance, be a database that may include parameters indicative of data such as, but not limited to, a source or node identifier, its current reference-to-zero value, its current bandwidth selection, its current frame resolution, a maximum buffer delay capacity of a delay buffer located at that node and a processing power of that node. The master list may be complied, in part, by the master controller pinging each node in order to obtain round trip delay times between the nodes, sources and master controller, from which relative delay times between the nodes and sources may be calculated. The master list may be updated by flagged messages indicating transmission and receipt of audio-visual assets. In this manner, each node and source may be assigned a current reference-to-zero value that may be updated on a continuous basis and may be indicative of its current transmission delay when sending data such as, but not limited to, audio-visual assets via the network.

The master controller may calculate a variety of additional metrics such as, but not limited to, a least common buffer delay of all the relevant nodes in its list or that may be required in a particular chain of processing and the predicted processing times of audio-visual assets by nodes to which applicable tasks have been assigned.

The master controller may also perform functions such as, but not limited to, checking to see if all communications between nodes and sources within a current chain of processing can be accomplished within the amount of delay indicated by those additional metrics in order to perform the currently setup task or chain of processing. If there is not possible, the master controller may automatically reassign tasks to different nodes, alter the bandwidth requirements of various node and source links or provide indications to operators of what settings need to be altered to obtain the required output.

For instance, if there are nodes or sources that are required to be linked in the current chain of processing and where the measured transmission delays are too great to be accommodated, the master controller may instruct one or more nodes to transmit at either a reduced frame size or an increased frame drop rate in order to expedite transmissions from them to other nodes or sources. In a more extreme case, such as when a new process or new node is added, a temporary break in the chain may be needed in which a re-buffering of some or all of the audio-visual assets may be undertaken in order to re-establish a synchronized output.

Therefore, the present invention succeeds in conferring the following, and others not mentioned, desirable and useful benefits and objectives.

It is an object of the present invention to provide an easily and reliably implemented system and method of synchronizing audio-visual assets in a distributed or cloud based production studio environment.

It is another object of the present invention to provide a cost effective system and method for implementing a cloud based audio-visual production studio.

DESCRIPTION OF THE SEVERAL VIEWS OF THE DRAWINGS

FIG. 6 A shows a schematic drawing of an exemplary audio-visual asset of the present invention as produced by an audio-visual source.

FIG. 6 B shows a schematic drawing of an exemplary audio-visual asset of the present invention as produced by a processing node.

FIG. 8 A shows a schematic drawing of a series of video frame sizes.

FIG. 8 B shows a schematic drawing of a series of frame drop rates.

DETAILED DESCRIPTION OF THE INVENTION

The preferred embodiments of the present invention will now be described in more detail with reference to the drawings. These embodiments are provided by way of explanation of the present invention, which is not, however, intended to be limited thereto. In fact, those of ordinary skill in the art may appreciate upon reading the present specification and viewing the present drawings that various modifications and variations can be made thereto. Identical elements in the various figures are, as far as possible, identified with the same reference numerals.

Figure 1:
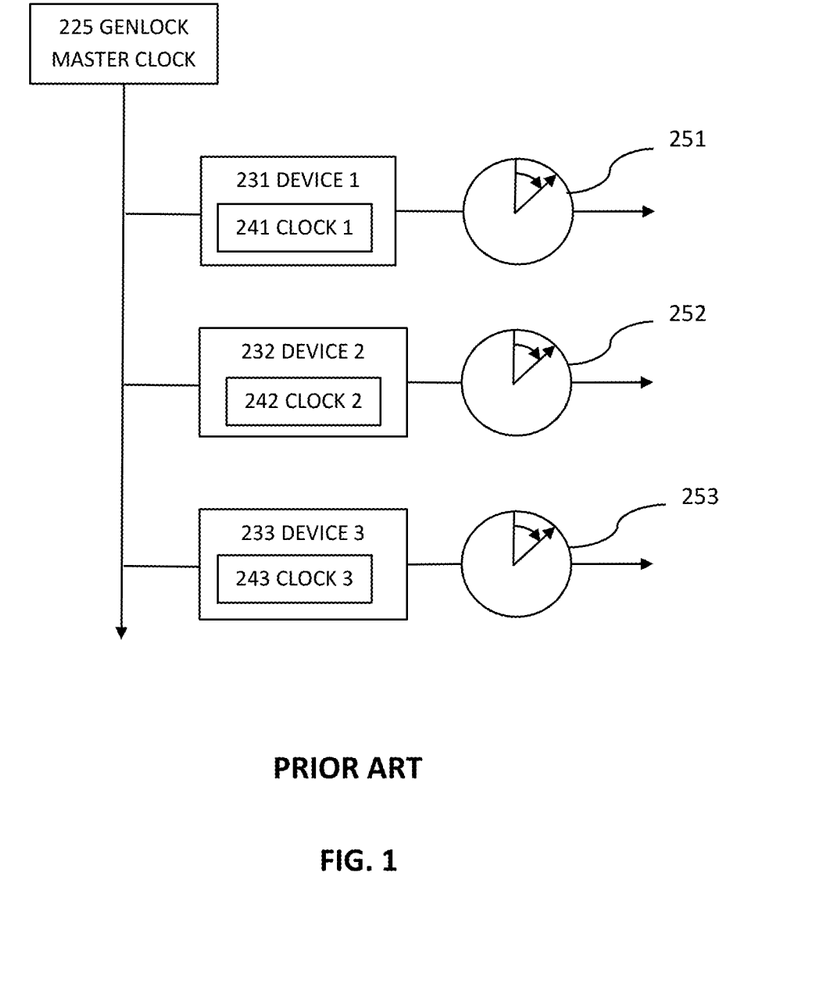
FIG. 1 shows a schematic drawing of prior art genlock synchronization of devices.

FIG. 1 shows a schematic drawing of prior art genlock synchronization of devices.

In such a prior art system each of the audio-visual devices used in the production are directly tied to a genlock master clock 225. As all the devices are effectively located in the same place, transmission delays between them are constant and insignificant on the time scale of television production in which audio-visual assets typically need to be synchronized to within a fraction of a millisecond.

As depicted schematically in FIG. 1, all the devices, illustrated here by first audio-visual device 231, the second audio-visual device 232 and the third audio-visual device 233 each have their own internal clocks, i.e., the first device clock 241, the second device clock 242 and the third device clock 243. These clocks may all be "slaved to", or "locked to", the genlock master clock 225 which may be the output signal of a digital signal generator. Such a genlocked system ensures that the output signals of all the devices all have the same effective start time and phase. The device output signals, i.e., the first genlock synchronized signal 251, the second genlock synchronized signal 252 and the third genlock synchronized signal 253 may, therefore, all be easily combined or integrated anywhere within the production studio as they are all synchronized to within the timing and phase requirements of broadcast quality television.

Such an arrangement may solve the technical problem of audio-visual asset synchronization within the confines of a traditional television production studio and allow for efficient television program production within such an environment. The arrangement may, however, have significant limitations when attempts are made to apply it to a distributed, cloud based studio environment in which the devices may be located remote from each other. In such an environment there may be variable, often unpredictable, transmission time delays between devices that may not be easily managed by a genlock solution.

Figure 2:
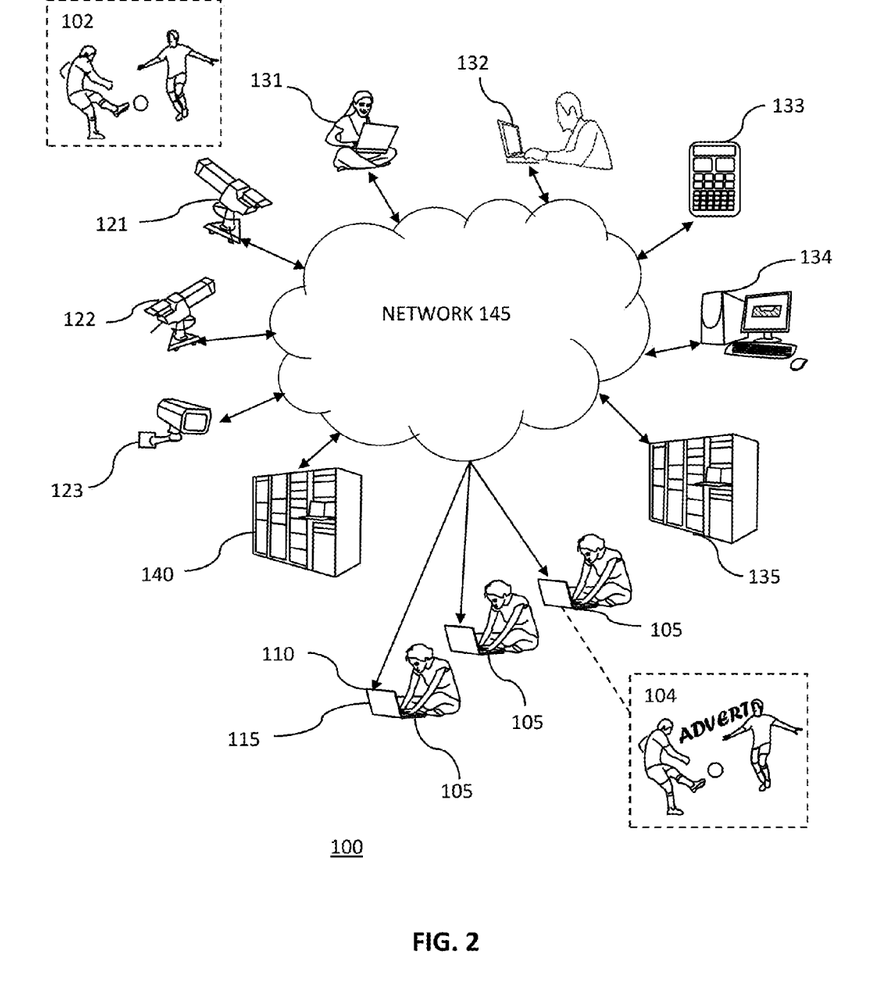
FIG. 2 shows a schematic overview of a system of an exemplary embodiment of a distributed or cloud based production environment in which the methods of the present invention may be required in order to effectively synchronize audio-visual assets.

FIG. 2 shows a schematic overview of a system of an exemplary embodiment of a distributed, or cloud based, production environment in which the methods of the present invention may be required in order to effectively synchronize audio-visual assets for the coordinated production of an acceptable final output such as, but not limited to, the production of a live television broadcast.

As shown in FIG. 2, the system may be being used to produce and distribute an audio-visual representation of a live event 102 to an end-viewer station 105 so that a viewer may watch that representation at a place remote from the event. The event may, for instance, be a sporting event, a concert, a theatrical production or some combination thereof. The end-viewer station 105 may, for instance, be a device such as, but not limited to, a television set in a viewer' home, a smartphone, a desktop computer, a laptop computer, a tablet computing device, a television set in a public place such as a bar, or some combination thereof.

A first step in such a production may be to use a first audio visual source 121 such as a broadcast quality television camera, to film the event. Additional audio-visual sources such as the second and third audio visual source 122, 123 may also be used, either for additional footage of the event or for other event related material. These audio-visual sources may be cameras, or other audio-visual production equipment, and may be located remote from the event at, for instance, a graphics producing studio. All the audio visual sources may forward their audio-visual assets onto processing nodes via the digital communications network 145.

There may be a number of processing nodes, each of which may be assigned, according to an operator determined chain of processing, to perform a different task using different hardware and software. In FIG. 2, five such processing nodes are shown: a first processing node 131, a second processing node 132, a third processing node 133, a forth processing node 134 and a fifth processing node 135. Together these processing nodes may function to combine the audio-visual assets produced by the sources into all, or part, of single stream of broadcast audio-visual assets to be viewed on a digital video display 110 and/or listened to on a digital audio loudspeaker 115. A video component 104 representative of the live event 102 is shown as being viewed on an end-viewer station 105.

In order to produce the required output program all the audio-visual sources and processing nodes need to be coordinated and synchronized to within the fraction of a millisecond time frame necessary for high quality broadcast television. A technical problem in achieving such synchronization is that there may be variable and unpredictable delays in transmitting the audio-visual data between the audio-visual sources and the processing nodes via the digital communications network 145. These variations in the transmission delay times may be caused by a number of factors such as, but not limited to, traffic dependent bandwidth variations in one or more of the transmission paths being use or alterations in the communications network routing priorities, or some combination thereof. These factors may need to be accounted for in order to achieve the required synchronization.

In a preferred embodiment, of the present invention, this accounting may be achieved by means of a master controller 140 that may also be remote from some or all of the sources and nodes and the use of buffers at each of the processing. The master controller 140 may, for instance, determine and record the transmission time, or delay, in sending audio-visual assets between itself and each of the nodes and sources attached to the network and required by the operator determined chain of processing. These constantly updated, measured delays, termed reference-to-zero values, may then be used by processing nodes to determine where in their local buffer to place each asset so they will emerge from the buffer to a local digital signal processor in synchronicity, i.e., so that assets originally produced at a common time are executed locally at a common time. These methods that are described in detail below.

Figure 3:
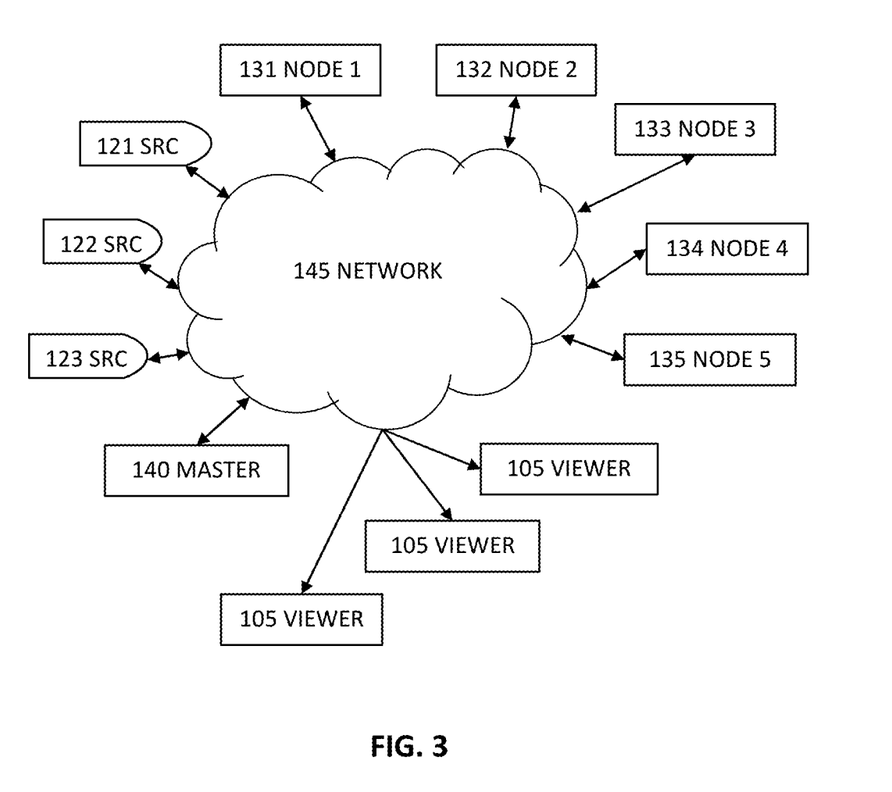
FIG. 3 shows a schematic overview of a system and method of a further exemplary embodiment of a distributed or cloud based production environment in which the methods of the present invention may be required in order to effectively synchronize audio-visual assets.

FIG. 3 shows a schematic overview of a system and method of a further exemplary embodiment of a distributed or cloud based production environment in which the methods of the present invention may be required in order to effectively synchronize audio-visual assets.

In the exemplary schematic shown in FIG. 3, the master controller 140 may communicate via the digital communications network 145 to synchronize and coordinate a first, second and third audio visual source 121, 122, 123 that themselves communicate via the digital communications network 145. The master controller 140 may also communicate via the digital communications network 145 to synchronize and coordinate a first, second, third, fourth and fifth processing node 131, 132, 133, 134 and 135 that may be used to combine the audio-visual assets produced by the sources into a synchronized stream of data packets to be delivered to one or more end-viewer stations 105.

Figure 4:
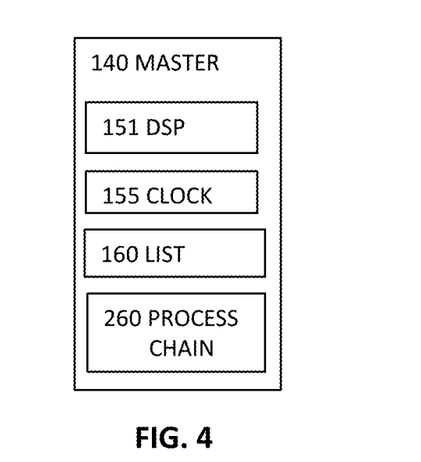
FIG. 4 shows a schematic drawing of an exemplary master controller of the present invention.

FIG. 4 shows a schematic drawing of an exemplary master controller of the present invention.

The master controller 140 may for instance include a master digital signal processor 151, a master clock 155, a master parameter list 160 and a chain of processing 260.

The master digital signal processor 151 may, for instance, be any suitable micro-processor or integrated circuit that may be configured to manipulate digital signals delivered in a suitable electromagnetic form. Examples of commercially available digital signal processors include, but are not limited to, the C6000 series of device produced by Texas Instruments of Dallas, Tex., that have clock speeds of 1.2 GHz.

The master clock 155 may be a digital circuit that produces a suitable timing signal, and may be a part of, or functionally connected to the master digital signal processor 151. Digital clock generators typically include a quartz piezo-electric oscillator, although simpler LC tuned circuits and even RC circuits may be used. The quartz-piezo electric resonant oscillators typically have a resonant frequency around 30 kHz and can, therefore, generate signals that can maintain synchronization well within the approximately 1 millisecond requirements of broadcast television.

The master parameter list may be a list of parameters that may, for instance, be stored in a digital memory that may form part, or all, of a digital database and which may be functionally connected to the master controller 140 and to the master digital signal processor 151.

The chain of processing 260 may, for instance, be a chain of instructions that may be determined partly, or in its entirety, by an operator. These instructions may, for instance, be stored in a database local to, and functionally connected to the master controller 140. The instructions may include data such as, but not limited to, the network address of the processing node to which a particular audio-visual source or processing node may send the audio visual assets it produced, the network address of the processing nodes or audio-visual source from which an audio-visual sources or processing nodes processing node may receive audio visual assets, the task or tasks a processing node may perform, parameters related to a task to be performed or some combination thereof.

The chain of processing 260 may be implemented by, for instance, the master controller 140 distributing the relevant instructions to appropriate audio-visual sources and processing nodes.

In an alternative embodiment, the chain of processing 260 instructions may initially be sent or place in an appropriate memory at one of more of the audio-visual sources or processing nodes by an operator, and may then be uploaded to the master controller 140.

Figure 5:
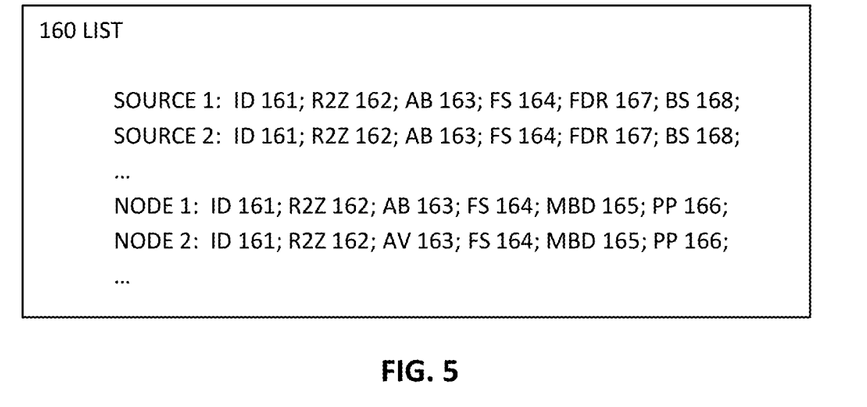
FIG. 5 shows a schematic drawing of an exemplary master parameter list of the present invention.

FIG. 5 shows a schematic drawing of a master parameter list of the present invention.

As can be seen from FIG. 5, the parameter list may be a database of information relevant to the synchronization of a group of audio-visual sources and processing nodes.

For a typical source and processing nodes, the parameters may, for instance, include data such as, but not limited to, an identifier 161, a reference-to-zero value 162, an available bandwidth 163, a frame resolution 164, a frame drop rate 167 and a bandwidth setting 168.

The identifier 161 may, for instance, be an alpha-numeric code that may uniquely identify the audio-visual source, or the processing node, within the communications network. The alpha-numeric code may, for instance, be a unique network address such as, but not limited to, an Internet Protocol (IP) address, a media access control (MAC) address, a telephone number, an email address, or some combination thereof.

The reference-to-zero value 162 may be a value that is indicative of a delay that occurs when transmitting an audio-visual asset between that particular source or node and the master controller. That delay may be measured by, for instance, "pinging" the source or node by the master controller. Pinging may be querying another device to both determine if that device is still connected to the network, and may further include obtaining data about that connection including, but not limited to, the round trip delay in making that connection. In the context of the present invention, the pinging may further include the master controller sending blocks of data such as, but not limited to, audio-visual assets, or blocks of audio-video assets, to a node or source to determine the round trip delay in sending such data. The reference-to-zero value 162 may, for instance, be determined as half the round trip transmission time between the master controller and the audio-visual source or the processing node.

The reference-to-zero value may be continuously updated and refined during the processing of data by, for instance, the master controller receiving flags indicating the receipt or transmission of data from processing nodes or audio-visual sources. By knowing the location of the flags within the stream of audio-visual content being transmitted, the master controller may calculate updated reference-to-zero values. This updating may be necessary because of variations in available bandwidth of particular transmission routes occasioned by, for instance, variations in network traffic, or networking routing protocols and procedure, or some combination thereof.

The available bandwidth 163 may, for instance, be indicative of the current transmission bandwidth available between the master controller and the audio-visual source or the audio-visual source. This may, for instance, be obtained using the pinging process described above. By measuring the roundtrip transmission time of a block of data of known totally byte size, an arithmetic calculation may yield the current bandwidth selection.

The frame size 164 may be indicative of the pixel size of a video component of an audio-visual asset that a particular audio-visual source or processing node may currently be set to either receive or transmit. High definition television may, for instance, be transmitted in a number of modes including the 720 p, 1080 i. 1080 p and 1440 p, all of which have different, but well-known, frame sizes. There are other well-known, lower pixel value frame sizes used for tasks such web transmission or offline video imaging, such as, but not limited to, the 320 by 240 pixel frame size and the 640 by 480 pixel frame size.

The frame drop rate 167 may be indicative of the number of frames of video within a steam of audio-visual assets that a particular audio-visual source or processing node may currently be set to receive, transmit or process. While audio-visual sources producing output quality video may be required to transmit every frame in a stream, sources producing graphics, or nodes performing certain match moving tasks may only be required to receive, transmit or process a fraction of the frames in a stream of audio-visual assets.

The bandwidth setting 168 may be indicative of the bandwidth that a particular audio-visual source or processing node is set to receive or transmit an audio visual asset. The bandwidth setting 168 may be a combination of the frame size 164 and the frame drop rate 167 as well as the frame rate at which the system is currently operating. If, for instance, the bandwidth setting 168 exceeds the currently available bandwidth 163, the master processor may elect to notify an operator to, or may itself automatically, adjust either the frame size 164 or the frame drop rate 167 or both of the particular audio-visual source or processing node in order to conform the bandwidth setting 168 to the available bandwidth.

Additional parameters that pertain more particularly to the processing nodes are the maximum buffer delay capacity 165 and the processing power 166.

The maximum buffer delay capacity 165 may be the maximum time, or the maximum number of clock cycles, a delay buffer functionally associated with a particular processing node may delay data such as an audio-visual asset. The maximum buffer delay capacity 165 may, for instance, be a function of the memory capacity and the internal architecture of the delay buffer 185 and is typically a constant value.

The processing power 166 may be the speed at which a digital signal processor functionally associated with a particular processing node may process data such as, for instance, an audio visual asset. The processing power 166 of a node may be related to the clock speed of the digital signal processor and is typically a constant. The master controller may use the processing power 166 of a processing node to calculate further values such as, for instance, the time delay a particular node will introduce into the system when performing a particular task such as, but not limited to, a match move calculation.

Figure 6:
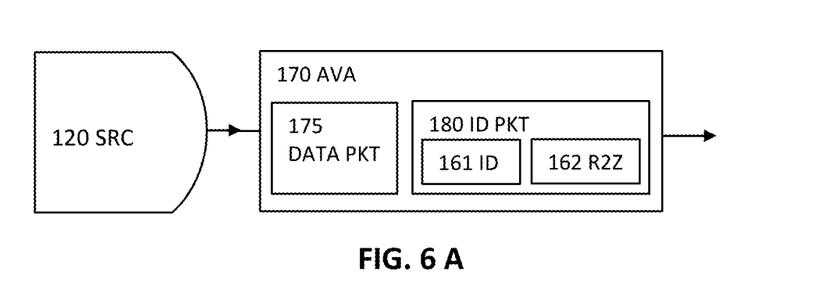

FIG. 6 A shows a schematic drawing of an audio-visual asset of the present invention as produced by an audio-visual source.

The audio-visual source 120 produces an audio visual asset 170 that may include a data packet 175 and an ID packet 180.

The data packet 175 may, for instance, include one or more video component and/or one or more audio components. The video component may, for instance, be one or more frames of digital video. The audio component may, for instance, be digital data indicative of speech, music or audio effects intended to accompany the video component.

The ID packet 180 may, for instance, include an identifier 161 and a reference-to-zero value 162.

The identifier 161 may be an address that uniquely identifies the sender of the audio visual asset 170, i.e., the audio-visual source 120, on the digital communications network. The identifier 161 may, for instance, be tag such as, but not limited to, Internet Protocol (IP) address, a media access control (MAC) address, a telephone number, an email address, or some combination thereof.

The reference-to-zero value 162 may be indicative of a current transmission delay that would have occurred had the audio-visual asset been transmitted from that particular source or node to the master controller.

FIG. 6 B shows a schematic drawing of an audio-visual asset of the present invention as produced by a processing node.

The processing node 130 produces an audio visual asset 170 that may include a data packet 175 and an ID packet 180.

The ID packet 180 may be identical to that produced by an audio-visual source and described in detail above.

The data packet 175 may, for instance, include data for use by other processing nodes or audio-visual sources such as, but not limited to, data relate to match move calculations such as, but not limited to, data on where in an image to position a graphic or which pixels in a frame to treat as being occluded by an object in that frame when adding in another graphic.

A process in which a processing node 130 uses the video or audio component of an audio visual asset 170 but only extracts data from it and does not alter the video or audio component may be termed a non-destructive process.

In contrast, a process in which the processing node 130 alters the video or audio component of the audio visual asset 170 such as when it merges it with another video or audio component, may be termed a destructive process, and the processing node 130 may now be determined to be an audio-visual source 120 for the purpose of the process chain in which it is currently operating.

Figure 7:
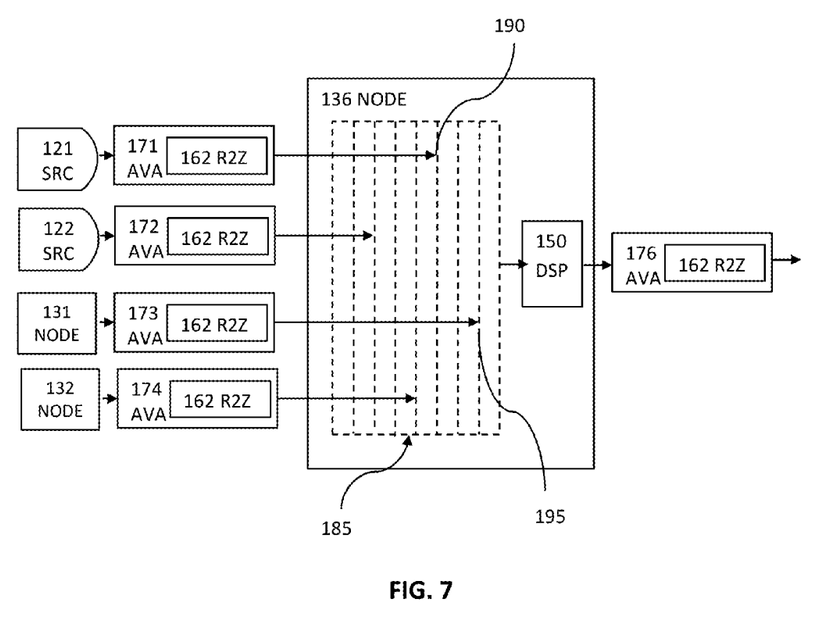
FIG. 7 shows a schematic drawing of an exemplary embodiment of a receiving processing node of the present invention.

FIG. 7 shows a schematic drawing of an exemplary embodiment of a receiving processing node of the present invention.

A receiving processing node 136 may include a delay buffer 185 and a digital signal processor 150. The receiving processing node 136 may receive one or more audio visual assets that may originate from one or more audio-visual sources and other processing nodes. Each of the audio-visual assets may include its own reference-to-zero value 162. That reference-to-zero value 162 may be used by the receiving processing node 136 to place the asset's contents in an appropriate delay buffer location 190 within the delay buffer 185 so that all contents may be processed in a synchronous manner by the digital signal processor 150. One the incoming contents are appropriately processed the receiving processing node 136 may then send out its own output audio visual asset 176 that may include its own reference-to-zero value 162.

FIG. 7 depicts four incoming streams of data arriving from first audio-visual source 121, a second audio-visual source 122, a first processing node 131 and a second processing node 132.

The first and second audio-visual source 121 may include cameras or other still image or video generating devices and may include devices such as, but not limited to, a smartphone camera, an electronic field production (EFP) camera, a broadcast studio camera, a camcorder, a point of view (POV) camera, a pan tilt zoom (PTZ) camera, a sports broadcast camera, a camera attached to a drone, a digital video recorder, a digital video player, a digital video mixer, a hard drive, a cloud located digital storage device or some combination thereof. The audio-visual sources may also or instead include one or more sound capturing or storage devices such as, but not limited to, a microphone, a digital audio recorder, a hard drive or some combination thereof.

Data arriving from the first and second audio-visual sources may include image related data such as, but not limited to, digital images, digital video and digital audio.

Data arriving from the first and second processing nodes may include image related data such as, but not limited to, digital images, digital video and digital audio, and may also or instead include instructional type data such as, but not limited to, data related to how to combine, alter or otherwise manipulate the image data being received from other devices such as, but not limited to, match move instructions such as, but not limited to, data related to where and at what orientation and what scale to place a graphic in a images, data related to what pixels of that graphic to occlude when placing it in an image, data related to how to alter color or brightness values of particular pixels, or some combination thereof.

The arriving data, i.e., the first audio visual asset 171, the second audio visual asset, the third audio visual asset 173 and the fourth audio visual asset 174, may each be placed in a delay buffer 185 that may be functionally connected to, and local to, the receiving processing node 136. The delay buffer location 190 in which each of the audio visual assets may be placed may be directly related to their reference-to-zero value 162. Although the reference-to-zero value 162 may be related to the time it would have taken to reach them to reach the master controller, and they have not gone via the master controller, but instead traveled via the communications network directly to the receiving processing node 136, their reference-to-zero values 162 are still an accurate indication of their timing with respect to one another when they reach the receiving node as they all share the same common communications link from the communication network to the receiving processing node 136, and, therefore, that part of their transmission delay is common.

Each of the audio visual assets may further contain a flag, or small data packet, that may be sent back to the master controller on their receipt by the receiving processing node 136. The master controller may then use the receipt of the flags to update the sources and the sending nodes respective reference-to-zero value 162. As the master controller already knows the receiving processing node's 136 reference-to-zero value 162, this may be subtracted from the total source or sending nodes transmission time to obtain an accurately updated indication of their reference-to-zero value 162.

Once the data is located in the delay buffer 185, it may be moved one buffer location closer to the digital signal processor 150 on each of the receiving processing node's 136 internal clock cycles, or some fixed multiple thereof. In that way, the asset data may all reach the digital signal processor 150 at a same time with respect to the master controller's master clock, thereby maintaining their absolute synchronization with respect to all other assets in the network that may be part of the current processing chain.

When the processing of the assets by the digital signal processor 150, the receiving processing node 136 has been completed, it may then deliver an output audio visual asset 176 back to the digital network and on to another processing node in the current chain of processing which may be identified by its unique network identifier. At the same time, another appropriate flag may be sent back to the master controller that may identify the task completed and the processing node completing it. Such a flag may then be used by the master controller to update relevant parameters such as, but not limited to, a reference-to-zero value, and a processing power of that processing node.

Figure 8A:
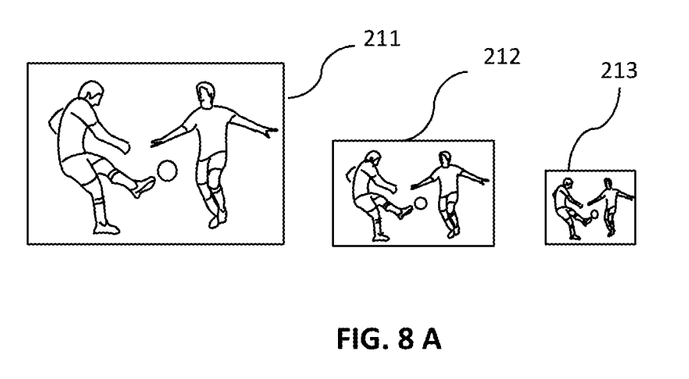

FIG. 8A shows a schematic drawing of a series of video frame sizes.

Each of the video frame sizes may correspond to one of the many well-known frame size standards typically used in broadcast television standards.

For instance, first video frame size 211 may be representative of the frame size required in so-call 1080 p full high definition broadcast. This video mode may be characterized as having 1080 horizontal lines of vertical resolution presented as a progressive scan, as opposed to an interlace scan. The aspect ratio in high definition may be taken to be 16:0, so that a frame of video is 1080 lines, each 1920 pixels long, resulting in a frame size of 2.1 megapixels.

The bandwidth required for transmitting uncompressed 1080 p video, the most suitable for editing, is dependent on factors such as how many bits are being used for color and the video frame rate. With 24 bit color, and a 60 Hz frame rate, uncompressed 1080 p video requires 2.98 Gbit/s bandwidth. The transmission bandwidth can be reduced significantly by the use of video compression such as, but not limited to, MPEG 4 compression that is based on discreet cosine transformations. The bandwidth savings available from technologies such as MPEG 4 can be varied depending on factors such as the number of frames that may be buffered at both the compression and decompression stages, and what degree of loss of detail is appropriate for the functions being implemented on the video.

Similarly, the second video frame size 212 may be representative of the 720 p standard that may be referred to as standard high definition, or simply high definition video. The 720 p video mode may be characterized as 720 lines of a frame having a 16:9 aspect ratio implying that each line is 1280 pixels long, and contains a total of 0.9 megapixels.

The third video frame size 213 may be representative of, for instance, a format requiring a lower bandwidth such as, but not limited to, one of the well-known CGA or VGA formats typically used in early computer graphics. Color Graphics Adapter (CGA), for instance, was one of the first color computer display standards and specified an image frame size of 640 by 200 pixels with a 4 bit color depth. This was superseded by the Video Graphics Array (VGA) that supported a range of video format including a 256 by 400 pixel size frame having a 16 bit color depth.

Super VGA (SVGA) has become an umbrella term for further computer monitor standards and now covers a variety of formats including frame sizes up to 2560 pixels by 1600 pixels, or 4 megapixels.

Figure 8B:
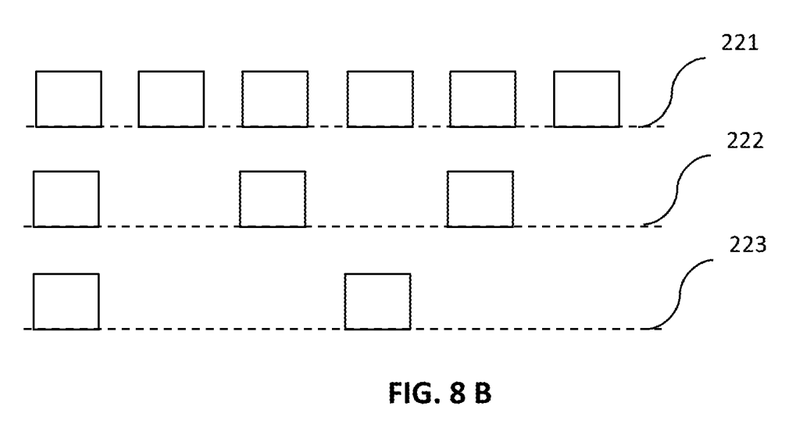

FIG. 8B shows a schematic drawing of a series of frame drop rates, with the rectangles representing video frames and the dotted line representing time.

One method to reduce a transmission bandwidth requirement while still transmitting uncompressed video is to only send some of the video frames as, in many circumstance, the frames are sufficiently similar that results obtained from one frame may be relevant several frames on.

The first frame drop rate 221 may represent not dropping any frames at all, but transmitting or processing every frame in the current chain of processing.

The second frame drop rate 222 shown schematically in FIG. 2 represents dropping every other frame, and only transmitting or operating on 50% of possible frames in the current chain of processing. This may, for instance, result in a 50% of reduction in a required bandwidth for transmission of the relevant assets.

The third frame drop rate 223 shown schematically in FIG. 2 represents only transmitting or operating on every third one of the possible frames in the current chain of processing. This may, for instance, result in up to a 66% reduction in a required bandwidth of transmission of the relevant assets.

Figure 9:
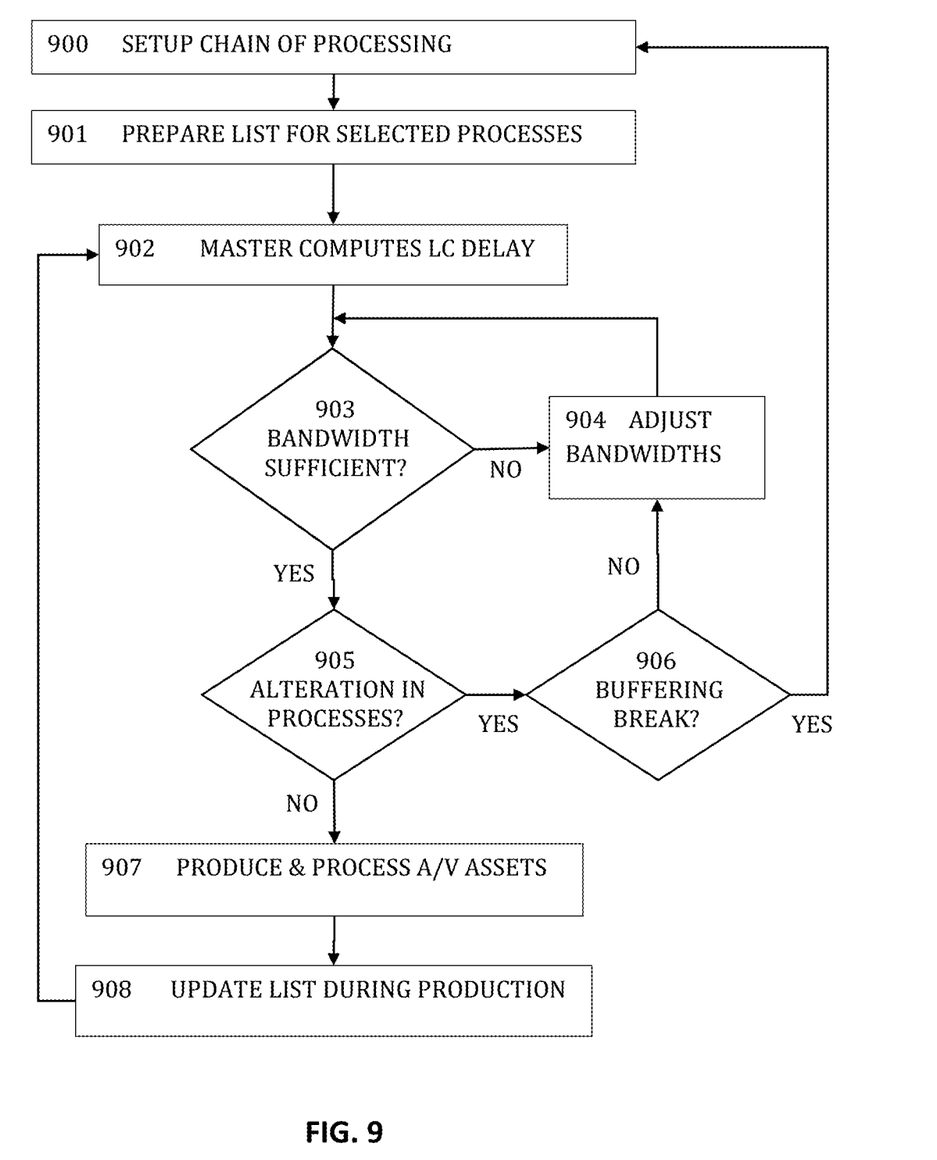
FIG. 9 shows a schematic flow diagram depicting possible steps for implementing an exemplary embodiment of the present invention.

FIG. 9 shows a schematic flow diagram depicting possible steps for implementing an exemplary embodiment of the present invention.

In Step 900 "Setup Chain of Processing" one or more operators may setup a chain of processing that may determine the manner in which all, or a part, of a video production may be produced. This may, for instance, include specifying a sequence of instructions indicating how audio-visual sources may be routed and how they may be treated by tasks. These tasks may, for instance, include analyzing video images to determine aspects such as, but not limited to, their orientation and scale with respect to a reference model, the occurrence of predetermined objects within them, the currently lighting conditions illuminating them, or some combination thereof. The tasks may, for instance, also or instead, include actions such as, but not limited to, combining videos, overlaying videos, inserting images within other images in video, adjusting the chromo or luminescence values, or both, of one or more pixels within a video, adding text to, or deleting text from, video, altering a formatting of video, compressing or decompressing video, adjusting audio volume and or pitch levels, adding or combining audio sources, or some combination thereof.

The chain of processing may include the network addresses from which audio-visual assets are to be sourced and the network address of where the results of any processing are to be delivered.

The chain of processing may be stored at a single location within a digital memory associated with a processing node, including with the master controller, or it may be stored in parts within a variety of nodes and may have a hierarchical structure or a tree structure, or some combination thereof.

The chain of processing may, for instance, be constructed by concatenating one or more existing chains of processing that may be stored as a library of chains of processing.

In Step 901 "Prepare List for Selected Processes", the master controller may populate its master parameter list by querying some or all of the audio-visual sources and processing nodes that may be actively involved in a currently setup chain of processing. These queries may be accomplished using the pinging methods described in more detail above.

In Step 902 "Master Computes LC Delay" the master controller may use the data now in its master list to calculate auxiliary parameters such as, but not limited to, a least common buffer delay or a processing delay that will be incurred by a particular node implementing a particular task, or some combination thereof. The least common buffer delay may, for instance, be representative of the least value of all the maximum buffer delay capacities of all the nodes in the master list that may be actively involved in a currently setup chain of processing. The least common buffer delay may, therefore, be the maximum allowable reference-to-zero value of any of the currently active processing nodes or audio-visual sources.

In Step 903 "Bandwidth Sufficient?" the master controller may check the master list parameters to ascertain if all the current reference-to-zero values fall within the calculated, current least common buffer delay. If they do, the process may move on to Step 905. However, if they don't, the process may move on to Step 904.

In Step 904 "Adjust Bandwidths", the master controller may attempt to alter the bandwidth requirements of one of more of the audio-visual sources or processing nodes in the current chain of processing. This alteration may, for instance, be accomplished using methods such as, but not limited to, changing the frame size or the frame drop rate 167 required for video transmitted from or too one of more of the audio-visual sources or processing nodes in the current chain of processing, or some combination thereof. The process may then loop back to Step 903 to check if the alterations made in Step 904 have solved the problem. If the process loops between Step 903 and Step 904 more than a small, limited number of times that may be three, without resolving the problem, an operator may be altered and required to make a manual adjustment to the system such as, but not limited to, adding or deleting one of more of the audio-visual sources or processing nodes, or reassigning tasks to one or more of the processing nodes.

In Step 905 "Alteration in Processes?" the master controller may query a current chain of processing database that may be located in any of the processing nodes, including the master controller. The current chain of processing database may, for instance, be list of current tasks, the processing nodes to which they may be assigned, an order in which they may be performed, addresses of audio-visual sources that may be used, and the addresses of processing nodes or audio-visual sources to which results may be sent. If an operator has requested a change in the current chain of processing, that request may appear in the current chain of processing database 270 as a change request. If no such request is present, the process may proceed to Step 907.

If an alteration in process request is detected, the process may then proceed to Step 906.

In Step 906 "Buffering Break?" the master controller may determine whether or not the change request is sufficiently disruptive that there may have to be a buffering break, i.e., a break in the currently being executed chain of processing that may require re-buffering all of the currently active audio-visual sources or processing nodes.

The change request is sufficiently small that it is determined that no buffering break is required, the system may proceed to Step 904 "Adjust Bandwidths" and proceed from there as detailed above. A non-disruptive change may be a request to make a minor alteration such as, but not limited to, a minor change in a frame drop rate, a minor change in a video frame size, a minor change in a task being performed by one of the nodes, or some combination thereof.

If on the other hand, the change request is deemed to be sufficient that a buffering break may be required, the system may then proceed to Step 900 "Setup Chain of Processing" to reset the chain of processing before proceeding to Step 901 and updating the entire master list for the audio-visual sources and processing nodes that will now be in the chain of processing. As this update may take several frames of video to be accomplished, the break in a chain of processing and re-buffering may best be undertaken when there is a natural break in the broadcast video such as, but not limited to, when interstitial advertising may be inserted by a node not in the current chain of processing. There may, however, be times when a few frames of disruption to the final output video are necessary to correct situations that might otherwise become more serious such as, but not limited to, when a necessary task has been accidently left out of the current chain of processing, or there is failure of one of more of the audio-visual sources or processing nodes, or if there is a significant traffic spike on a portion of the communications network, or some combination thereof, At Step 907 "Produce & Process A/V Assets" the system may now proceed to execute the currently setup chain of processing 260. The audio-visual sources and processing nodes may now interact such that their output audio visual assets are all synchronized and coordinated to produce a stream of final output audio visual assets that may be delivered to the end-viewer as a high quality audio-visual performance that may, for instance, be representative of a live event.

During the processing, one or more flags may be sent to the master controller. These flags may, for instance, be indicative of events such as, but not limited to, the receipt, the sending, or the end of processing of a particular audio visual asset by a particular one of the audio-visual sources or processing nodes. Receipt of such a flag may have the system proceed to Step 908 "Update List during Production".

In Step 908 "Update List during Production", the system may utilize the flags received while the currently selected chain of processing may be executing, and the system may use them to update the master list. Once significant changes have been made to the master list, or after a predetermined time or number of frames, the system may then proceed to Step 902 "Master Computes LC Delay" and proceed from that point as before.

Although the foregoing description may be directed towards producing live television events for broadcast to remote audiences for viewing on television like devices, one of ordinary skill in the art will appreciate that the methods described above have wide applicability and may, to a large degree, be independent of the detailed technology of the video producing, manipulating and viewing devices. The methods described above may, for instance, be applicable in a wide range of audio-visual asset production, manipulation and distribution scenarios such as, but not limited to, the distributed production of films in which real-time, or near real-time feedback on the interaction between actors and other video assets such as, but not limited to, computer generated graphics, may be desirable. The system and method of the present invention may, for instance, be beneficial to any production scenario in which there may be a geographically dispersed production, manipulation and viewing technologies that require to have some or all of their audio-visual assets synchronized so as to collaboratively produce an end product, or a part of an end-product. Such situations may, for instance, include setups such as, but not limited to, musicians in different geographical locations producing an audio component, geographically dispersed graphic artists combining to edit and/or produce a graphic effect, geographically remote directors/producers interacting to combine audio-visual assets for all or part of a production, or some combination thereof. The system and method of the present invention may also be performed on a variety of hardware platforms and are not intended to be limited to the specific examples given above, but may include scenarios where the end product may be delivered to any suitable device that may have acceptable audio-visual output capabilities such as, but not limited to, smartphones, smart watches and tablet devices as well as the more traditional television sets, movie theater screens and desk top computer displays, or some combination thereof.

Although this invention has been described with a certain degree of particularity, it is to be understood that the present disclosure has been made only by way of illustration and that numerous changes in the details of construction and arrangement of parts may be resorted to without departing from the spirit and the scope of the invention.

The invention claimed is:

1. A method of synchronizing audio-visual assets, comprising:
providing one or more remotely located end-viewer stations comprising a digital video display and a digital audio loudspeaker;
providing one or more remotely located audio-visual sources at least one of which produces an audio-visual asset representative of a live event;
providing one or more remotely located processing nodes each of which comprises a digital signal processor and a delay buffer;
providing a master controller comprising a master digital signal processor, a master clock and a master parameter list, said master parameter list comprising, for each processing node and source, parameters indicative of an identifier, a reference-to-zero value, available bandwidth, a frame size, a frame drop rate and a bandwidth setting, and additionally for each processing node, parameters indicative of a maximum buffer delay capacity and a processing power;
sending, by a first one of said audio-visual sources, via a digital communications network, a first one of said audio-visual assets, and by a second one of said audio-visual sources, a second one of said audio-visual assets, each of said audio-visual assets comprising a data packet and an ID packet, said ID packet comprising said source identifier and said source-reference-to zero value, said source reference-to-zero value being indicative of a transmission time delay of said audio-visual asset between said source and said master;
receiving, by one of said processing nodes, said first and second audio-visual assets;
placing, by said receiving processing node, each of said audio-visual assets in said delay buffer in delay buffer locations such that said first and second audio-visual assets are processed by said digital signal processor at common time with respect to said master clock to produce an output audio-visual asset;
transmitting by said receiving processing node, said output audio-visual asset synchronized to a current reference to zero value of said receiving processing node;
receiving by said one or more end viewer stations said output audio-visual asset;
displaying, by said receiving end viewer stations, a video component of said output audio-visual asset on said end viewer digital video display; and
producing, by said receiving end viewer stations, an audible sound corresponding to an audio component of said output audio-visual asset produced by said digital audio loudspeaker.

2. The method of claim 1 further comprising:
sending, by a second one of said processing nodes, via said digital communications network, a third one of said audio-visual assets;
receiving by said receiving node, said third audio-visual asset; and
placing, by said receiving processing node, said third audio-visual asset in said delay buffer at a delay buffer location such that said first, second and third audio-visual assets are processed by said digital signal processor at a common time with respect to said master clock to produce said output audio-visual asset.

3. The method of claim 2 further comprising:
calculating, by said master digital signal processor, a least common buffer delay of said maximum buffer delays for a set of node parameters contained in said master parameter list; and
altering a required transmission bandwidth of one or more of said audio-visual assets such that said output audio-visual asset may be produced within said least common buffer delay, said altering comprising changing a video frame size, or a frame drop rate, or both, of said audio-visual source generating said audio-visual asset or said processing node generating said audio-visual asset.

4. The method of claim 3 wherein first audio-visual source is a broadcast quality television camera.

5. The method of claim 4 wherein said third audio-visual asset comprises instructions for placing a graphic generated by said second audio-visual source at a predetermined location within a video frame of a video component of one of said first audio-visual assets produced by said first audio-visual source.

6. The method of claim 5 further wherein said digital signal processor on said receiving processing node performs functions comprising real-time match moving computer graphics insertion in said output audio-visual asset.

7. The method of claim 2 further comprising an alteration in a processing requirement of said one or more assets, a detection of a requirement for a break in a chain of processing and a re-buffering of one or more of said audio-visual assets to facilitate said break in said chain of processing.

8. A system for synchronizing audio-visual assets, comprising:
- one or more audio-visual sources at least one of which produces an audio-visual asset representative of a live event;
- one or more processing nodes each of which comprises a digital signal processor and a delay buffer;
- a master controller comprising a master digital signal processor, a master clock and a master parameter list, said master parameter list comprising, for each processing node and source, parameters indicative of an identifier, a reference-to-zero value, a bandwidth selection, a frame resolution, and additionally for each processing node, parameters indicative of a maximum buffer delay and a processing power;
- a first one of said audio-visual assets sent by a first one of said audio-visual sources via a digital communications network and received by one of said processing nodes, and a second one of said audio-visual assets sent by a second one of said audio-visual sources via said digital communications network to said same receiving processing node, each of said audio-visual assets comprising a data packet and an ID packet, said ID packet comprising said source identifier and said source-reference-to zero value, said source reference-to-zero value being indicative of a time delay between transmission of said audio-visual asset by said source and a current time of said master clock;
- delay buffer locations in said receiving processing node wherein each of said first and second audio-visual assets are placed such that said first and second audio-visual assets are processed by said digital signal processor at common time with respect to said master clock to produce an output audio-visual asset synchronized to a current reference to zero value of said receiving processing node; and
- one or more end-viewer stations comprising a digital video display and a digital audio loudspeaker, and wherein one or more of said end-viewer stations receive, via said digital communications network, said output audio-visual asset transmitted from said receiving processing node and display a video component of said output audio-visual asset on said end viewer digital video display and produce, using said digital audio loudspeaker, an audible sound corresponding to an audio component of said output audio-visual asset.

\* \* \* \* \*